UNITED STATES PATENT OFFICE.

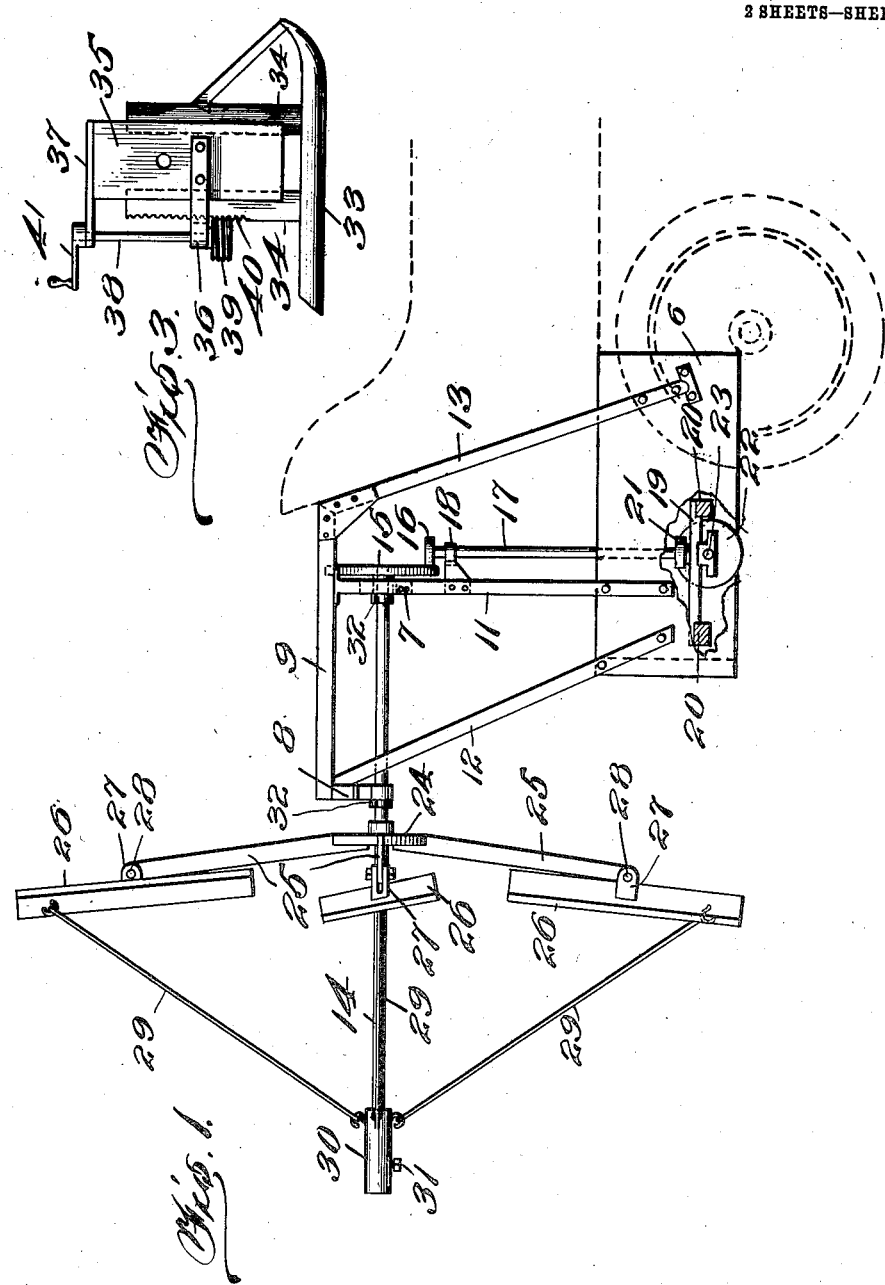

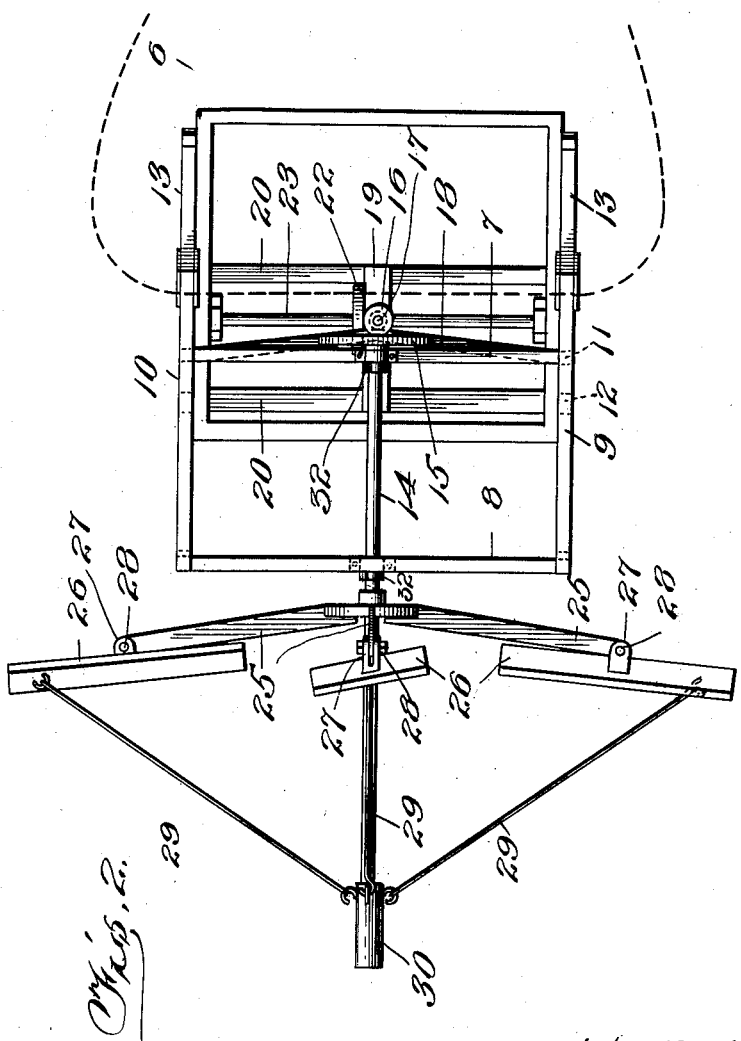

JOHN R. FABER, OF MOUNT PLEASANT, MICHIGAN.

PROPELLING MEANS FOR MOTOR-VEHICLES.

955,146.  Specification of Letters Patent.  Patented Apr. 19, 1910.

Application filed October 5, 1909. Serial No. 521,170.

*To all whom it may concern:*

Be it known that I, JOHN R. FABER, a citizen of the United States, residing at Mount Pleasant, in the county of Isabella and State of Michigan, have invented certain new and useful Improvements in Propelling Means for Motor-Vehicles, of which the following is a specification.

This invention relates to motor vehicles, and has for its object to provide means for driving the vehicle, so that it may travel on the ground, or on snow or ice, improved means being provided comprising a propeller which revolves in the air and which by air pressure will serve to drive the machine forward. The machine is provided with runners which may be raised or lowered, so that when the vehicle is traveling on snow or ice the runners will be used, means being provided to lift the vehicle so that the wheels will be raised from the surface of the snow or ice and the vehicle will rest and travel on the runners. The propelling devices include a propeller at the rear of the machine driven by a motor geared thereto.

The details of the invention will be evident from the following description and the accompanying drawings in which—

Figure 1 is a side elevation showing a vehicle provided with the improvement. Fig. 2 is a top plan view, partly broken away. Fig. 3 is a section of the means for supporting the runners, and showing how they may be raised or lowered.

Referring specifically to the drawings, 6 indicates the frame of the vehicle, properly constructed to support the seats and other parts of the body, and also to support the parts to be hereinafter described. At the rear of the frame are supports for the propeller and its shaft and the gearing applied thereto. These supports comprise cross beams 7 and 8 connected by longitudinal beams 9 and 10 at opposite sides, and supported by uprights 11 and 12 at each side, the latter being inclined upwardly and backwardly to the rear end of the beams 9 and 10 so that the propeller will hang or project out behind the rear of the vehicle. Braces 13, at the front, aid in maintaining the parts in position. The propeller shaft is indicated at 14, and it is mounted in the bearings in the cross beams 7 and 8, at the middle thereof, and it extends lengthwise with respect to the machine with the rear end projecting. At the front end the shaft has a friction disk 15 which is engaged by a friction wheel 16 on an upright shaft 17 supported in bearings in an upper cross beam 18 and a lower longitudinal beam 19 the latter being set on supports 20 extending across within the frame of the vehicle. The lower end of the shaft 17 carries a friction wheel 21 which is engaged by a friction disk 22 carried on a cross shaft 23 to which the power may be applied from the motor or engine, (not shown), in any suitable manner.

The propeller is mounted upon the rear projecting end of the shaft 14. It consists of a disk 24 from which project radial arms 25 to the outer ends of which the blades 26 are connected by means of brackets 27 and bolts 28 the latter extending through ears on the brackets and through the ends of the arms 25 which ends fit between the ears. The brackets are so constructed that the blades of the propeller are presented at an angle in order to give the thrust when the propeller is revolved. The blades are strengthened or stayed by means of rods 29 which are connected at one end to the faces of the blades and at the other end to a sleeve 30 fastened on the rear end of the shaft 14. The connections between the rods and the blades and the sleeve are flexible, and the bolts 28 permit a limited amount of movement of the blades on said bolts and pivots, the movement being in a plane parallel to the arms 25 which support the blades. The sleeve 30 may be shifted lengthwise on the shaft, and fastened by a set screw 31. This permits the angle or rake of the blades to be varied, since when the sleeve 30 is moved in or out the blades will be tilted more or less on the pivots 28, to vary their angle of longitudinal inclination with respect to the shaft, in order to produce the best results.

It is obvious that when the propeller shaft is driven by the means above described the propeller will be revolved and by its pressure on the air will serve to drive the vehicle forward. Suitable collars 32 are placed on the shaft 14 to stand the thrust. The propelling means described may be used either alone or in addition to the ordinary driving power of the vehicle, when the machine is traveling on land.

For use on ice or snow I provide runners 33 on which are mounted spaced standards 34 which form guides for a sliding block or piece 35 bolted to the side beams of the frame 6, conveniently just within the axles.

Each block 35 carries a lower bracket 36 and an upper bracket 37 having bearings for a shaft 38 at the lower end of which is a worm 39 which engages a rack 40 formed on the rear edge of the rear standard 34. At the upper end the shaft 38 is provided with a crank handle 41.

When the crank 41 is turned the engagement of the worm with the rack will raise or lower the runner, when the same is forced down sufficiently the body of the vehicle will be lifted and the usual wheels will be raised from the ground, the vehicle resting on the runners, and by means of the aerial propeller shown the vehicle may be driven over the surface of snow or ice.

The invention is not limited to the exact structure shown, and various modifications in the details thereof may be made within the scope of the invention.

What I claim as new is:—

The combination of a shaft, radial arms projecting from the shaft, blades pivoted on one side to the outer ends of the arms, the axes of the pivots being crosswise of the arms, so that the blades swing in planes parallel to the axis of the shaft, an adjustable sleeve on the shaft, and rods connecting the blades and the sleeve.

In testimony whereof, I affix my signature in presence of two witnesses.

JOHN R. FABER.

Witnesses:
HERMAN A. FABER,
GEORGE DIXON, Jr.